H. E. BAYLY.
DIFFERENTIATING MECHANISM.
APPLICATION FILED MAY 12, 1913.
1,098,422.
Patented June 2, 1914.
2 SHEETS—SHEET 1.
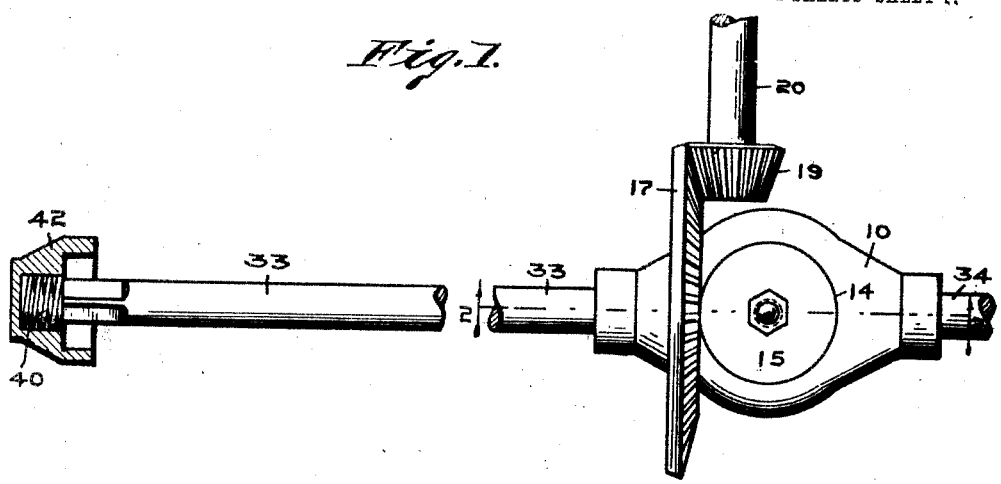
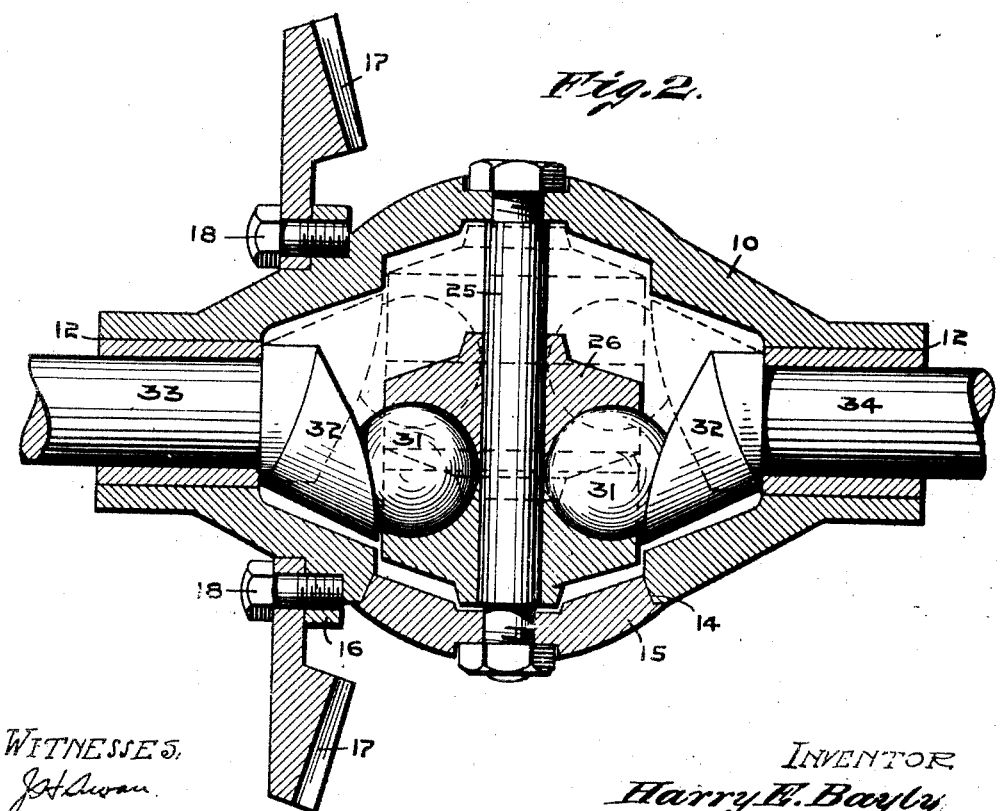
WITNESSES.
INVENTOR
Harry E. Bayly
ATTORNEYS.

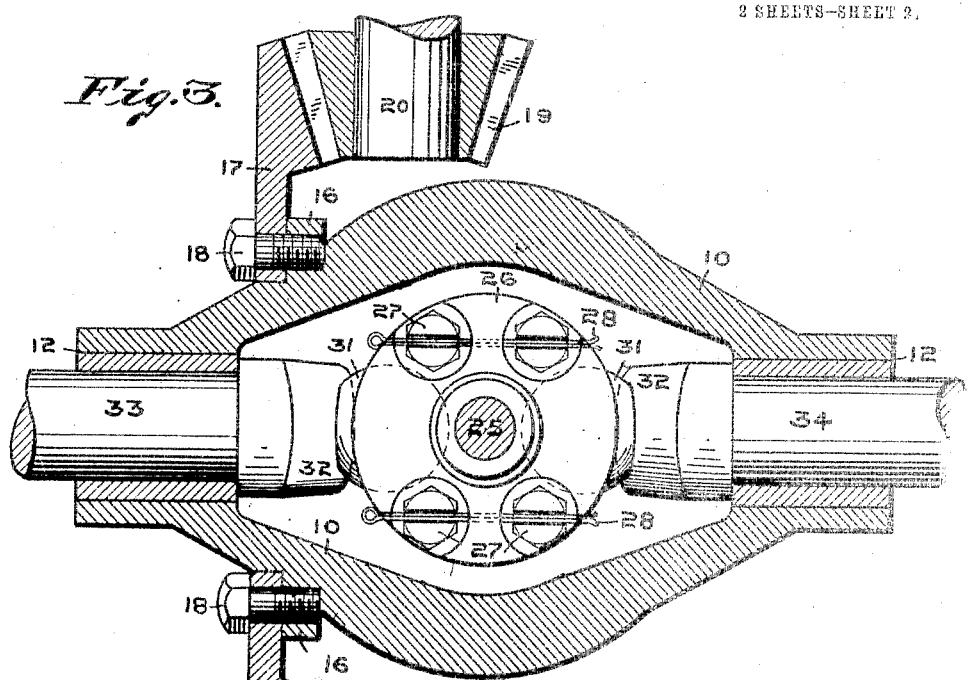
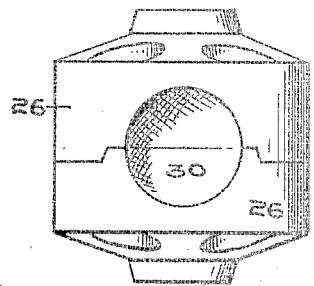
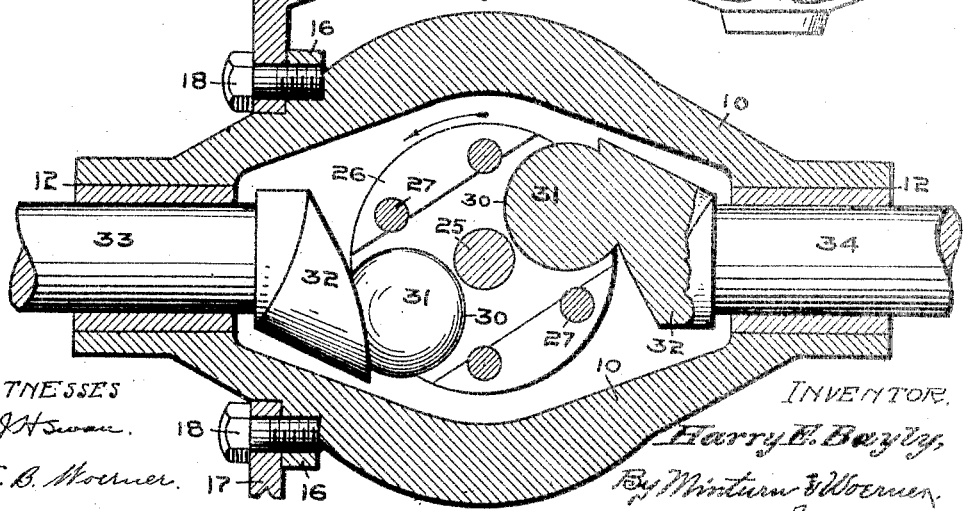

UNITED STATES PATENT OFFICE.

HARRY E. BAYLY, OF INDIANAPOLIS, INDIANA.

DIFFERENTIATING MECHANISM.

1,098,422.  Specification of Letters Patent.  Patented June 2, 1914.

Application filed May 12, 1913. Serial No. 767,121.

*To all whom it may concern:*

Be it known that I, HARRY E. BAYLY, a citizen of the United States, residing at Indianapolis, in the county of Marion and State of Indiana, have invented certain new and useful Improvements in Differentiating Mechanism, of which the following is a specification.

This invention relates to differential mechanisms, to be used wherever a difference in the movements of parts is desired or necessary, the same being particularly applicable to be used in connection with motor cars; and the object of the invention is to provide a differential mechanism of the above character in which the gears usually employed in such mechanisms are dispensed with, thereby producing a mechanism that will be simple and durable in construction and which will be efficient in operation.

A further object of the invention is to provide a differential mechanism of the above character wherein the same results are obtained as in similar constructions embodying gears or pinions so that the exactness necessary in the manufacture of toothed gears, ratchets and friction devices is eliminated.

A further object of the invention is to provide a differential mechanism wherein the arrangement and mechanical construction of the various parts will permit the driven axles to rotate at different speeds while being driven from a common driving member, whereby the decreasing movement, which is known as a "compensating movement," is obtained, thereby permitting the power transmitted from the engine to be equally divided between the driven axles and wheels in such a way that either driven axle or its wheel is at all times free to take the initiative during the period of increasing or decreasing speeds.

A further object of the invention consists in the provision of a differential mechanism wherein the number of working parts that comprise said mechanism are greatly reduced, thereby increasing the working efficiency thereof while at the same time reducing the cost of construction and maintenance of same.

To accomplish these ends, the invention comprises the novel details of construction and arrangement of parts, as fully shown in the accompanying drawings, and described in the following description, which forms a part of this application, in which—

Figure 1 is a top or plan view of the differential housing, and the driven axles, showing the gear mechanism by which power from the engine is applied to the differential mechanism. Fig. 2 is a longitudinal section, on a considerably enlarged scale, on the line 2—2 in Fig. 1. Fig. 3 is a top or plan view of the construction shown in Fig. 2, except that the casing is shown in section. Fig. 4 is a view similar to Fig. 3, except that the internal parts of the differential mechanism are shown in changed position. Fig. 5 is a view of the movable head whereby a connection is formed between the adjacent ends of the driven axles.

Referring to the drawings, 10 represents the casing in which the differential mechanism is housed, said casing being cast in one piece, hollow in the center to provide working room for the internal parts of the differential mechanism, and being further provided with the apertures 12 to admit the driven axles, and the opening 14 through which access may be had to the interior of the casing, the latter opening being closed by means of a cap or plate 15. The casing 10 is provided with an integrally formed rib 16 to which a bevel pinion 17 is secured by means of suitable bolts 18. The pinion 17 meshes with the pinion 19 which is secured to the driving shaft 20 which leads to a suitable power generator. By this construction when the driving shaft 20 is rotated, movement of rotation will be imparted to the casing 10 through the pinions 19 and 17. The casing is provided with a centrally disposed transverse pin 25 which, in addition to holding the cap 15 in place, forms a mounting and guide for a suitable head 26, the latter being made in two parts, as shown in Fig. 5, to admit of easily assembling the differential mechanism; the two parts of the head 26 being held together by means of suitable bolts 27. See Figs. 3 and 4. The heads of the bolts 27 are preferably provided with a groove or slot to receive suitable cotter-pins 28, whereby the said bolts are prevented from working out, induced by the vibration of the parts. The head 26 is provided in its opposite sides with suitable semi-spherical recesses 30 to receive the balls 31 which are formed integrally with the crank members 32 formed integrally with the axles 33 and 34. This arrangement permits one member of the head 26 to be passed through the opening 14 and on the pin 25, after which the balls 31 may be placed into the semi-spherical recesses in said member, after which the remaining member of said head may be placed into position, the two members of the head then being secured together by means of the bolts 27. The recesses 30 are cut sufficiently deep in the head 26 to allow the head 26 to extend beyond the center of the balls, thereby preventing accidental longitudinal displacement of the axles from the head 26.

When the differential mechanism herein shown is employed in connection with a motor car, it will be noted that the pinion 17, the housing 10, together with the axles 33 and 34 and the head 26 will rotate in unison when the car is traveling in a straight line, the power being transmitted from the casing through the vertical pin 25. When, however, the car turns a corner, where the radius of the arc of travel of one of the rear wheels is greater than the radius of the arc of travel of the other, compensation of movement of the internal parts of the mechanism must be provided to allow for this variation in travel of the wheels, and this variation of the movements of the parts is permitted by means of the movable head 26. In case the wheel on the end of the axle 34 is traveling over the greatest arc in making the curve the said axle will oscillate or rock sufficiently in the direction in which the wheel is moving to cause the crank 32 and ball 31 connected therewith to advance in the same direction, the advance movement depending upon the excess of travel of the wheel on said axle over the travel of the wheel on the axle 33. The crank construction on the axle 34 will cause the head 26 to revolve and oscillate on its axis around the pin 25, in case the car is moving forward, in the direction of the arrow in Fig. 4, while the ball on the end of the crank axle 33 has correspondingly moved backward toward the position of the parts shown by the full lines in Fig. 4. Thus it will be seen that the compensatory movement necessary to allow the center of the ball to move away from the plane through the longitudinal axis of the axles 33 and 34 is permitted by the movement of the head 26 around the pin 25. When the car is again righted and is moving in a straight-away path the parts maintain their relative positions until the car rounds another curve. In case the curve taken is in the same direction as the former one the head 26 will continue to move in the same direction as before, whereas should the car round a curve extending in the opposite direction from the former one, the head 26 will move in the opposite direction around the pin 25, to allow the necessary compensatory movement of the axles 33 and 34. The movement of rotation of the balls 31, cranks 32 and axles 33 and 34 necessitates an additional compensatory movement of the head 26 than that of movement of rotation around the pin 25. For instance, the continued movement of the axles and cranks in the same direction, causing the balls 31 to travel in a circle that intersects the horizontal plane passing through the longitudinal axis of the axles 33 and 34, necessitates the head 26 to travel longitudinally along the pin 25. Two different positions of said head on said pin are shown by means of the full and the dotted lines in Fig. 2. of the drawings. The outer ends of the axles 33 and 34 are squared where they make engagement with the wheels of the car, to force the wheels to rotate with the axles, and to prevent noise through vibration, I mount a spring 40 to bear and exert a tension against the ends of the axles 33 and 34, forcing the latter in the direction of the head 26. The springs 40 are held and are inclosed by suitable caps 42 secured to the hubs of the wheels.

From the foregoing description it will be seen that the working parts of the hereinabove described differential mechanism are few in number and are of substantial construction to withstand the strain to which a mechanism of this character is subjected, and it will be further noted that when the two wheels of the car are moving along parallel planes of uniform length, the head 26, casing 10 and axles 33 and 34 all revolve as a single unit structure, highly susceptible of slight and modifying movements between the axles 33 and 34 when a wheel on one axle is traveling along a plane of greater length than the travel of the wheel on the other axle. Moreover, I produce a construction in differential mechanisms in which the element of lost motion is reduced to a minimum, and far below that possible to be obtained where intermeshing pinions are employed in such mechanisms.

While I have described my invention with more or less minuteness as regards details of construction and arrangement, and as being embodied in certain precise forms, I do not desire to be limited thereto unduly or any more than is pointed out in the claims. On the contrary, I contemplate all proper changes in form, construction and arrangement, the omission of immaterial elements and the substitution of equivalents, as circumstances may suggest or necessity render expedient.

Having thus fully described my said invention, what I claim as new and wish to secure by Letters Patent, is—

1. A differential mechanism comprising a pair of oppositely disposed alined axles, said axles having crank-members formed thereon and said crank-members having balls thereon, a movable head provided with recesses to receive said balls, a pin passing longitudinally through said head, a casing for holding said pin stationary and for inclosing said head and crank-members, and means for imparting movement of rotation to said casing.

2. A differential mechanism comprising a hollow casing, a pair of alined axles extending longitudinally through said casing, said axles having crank-members formed thereon and said crank-members having balls thereon, an oscillating head interposed between and making a working engagement with the adjacent crank members, a casing for inclosing said head and crank-members, means extending transversely through the casing and longitudinally through the head to hold the latter in operative position, and means for imparting movement of rotation to said casing.

3. A differential mechanism comprising a casing, a pair of alined axles extending longitudinally through said casing, said axles having crank-members formed thereon and said crank-members having balls formed thereon, a two-part head having recesses adapted to receive said balls, means for holding the two parts of the head together, a pin for mounting said head, said pin being secured in said casing, and means for imparting movement of rotation to said casing.

4. A differential mechanism comprising a hollow casing, a pair of axles projecting longitudinally into said casing, said axles having crank-members formed thereon and said crank-members having balls thereon, a pin extending transversely through said casing and between the opposing ends of said crank-members, means comprising a movable head mounted on said pin and making working engagement with said crank-members, and means for imparting uniform movement of rotation to said casing.

5. A differential mechanism comprising a hollow casing, a pair of axles projecting into said casing, said axles having crank-members formed thereon and said crank-members having balls thereon, a pin extending transversely through said casing and between the opposing ends of said crank-members, means comprising a movable head mounted on said pin and making working engagement with said crank-members, and means for imparting movement of rotation to said casing.

6. A differential mechanism comprising a hollow casing, a pair of axles projecting into said casing, said axles having crank-members thereon and said crank-members having balls thereon, a pin extending transversely through the casing, and means comprising a movable member on said pin making working engagement with said crank-members to change the position of one axle to that of the other.

7. A differential mechanism comprising a pair of alined axles having crank-members formed on their adjacent ends and said crank-members having balls thereon, a movable member interposed between and making a working engagement with the adjacent crank-members of said axles, said movable member susceptible to both reciprocating and rocking movements, a support for mounting said movable member, a frame for holding said support in operative position, and means for imparting movement of rotation to said frame.

In witness whereof, I have hereunto set my hand and seal at Indianapolis, Indiana, this 29 day of April, A. D. one thousand nine hundred and thirteen.

HARRY E. BAYLY. [L. S.]

Witnesses:
F. W. WOERNER,
I. L. LARSON.